3,061,281
DISPENSING FREEZER
Louis A. M. Phelan and Lawrence E. Koch, Rockton, Ill.; said Koch assignor to said Phelan
Filed Feb. 28, 1961, Ser. No. 92,286
9 Claims. (Cl. 259—109)

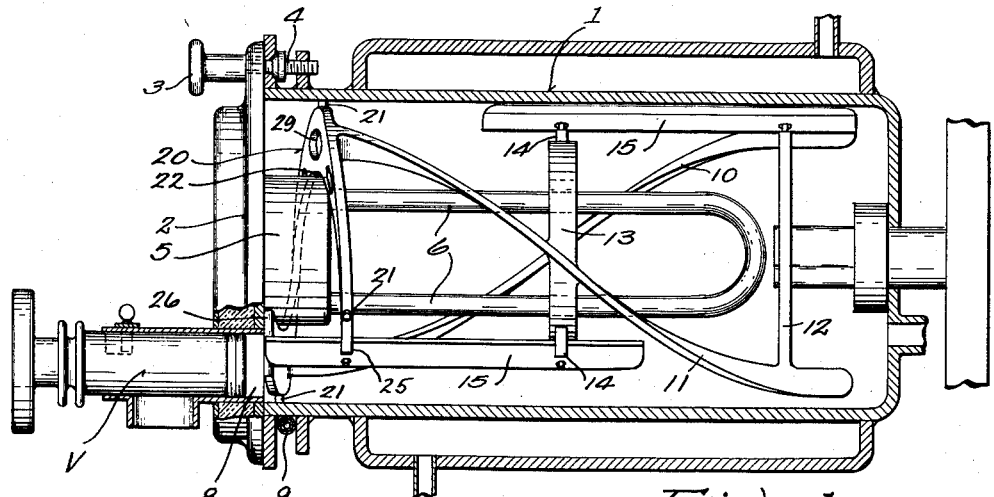
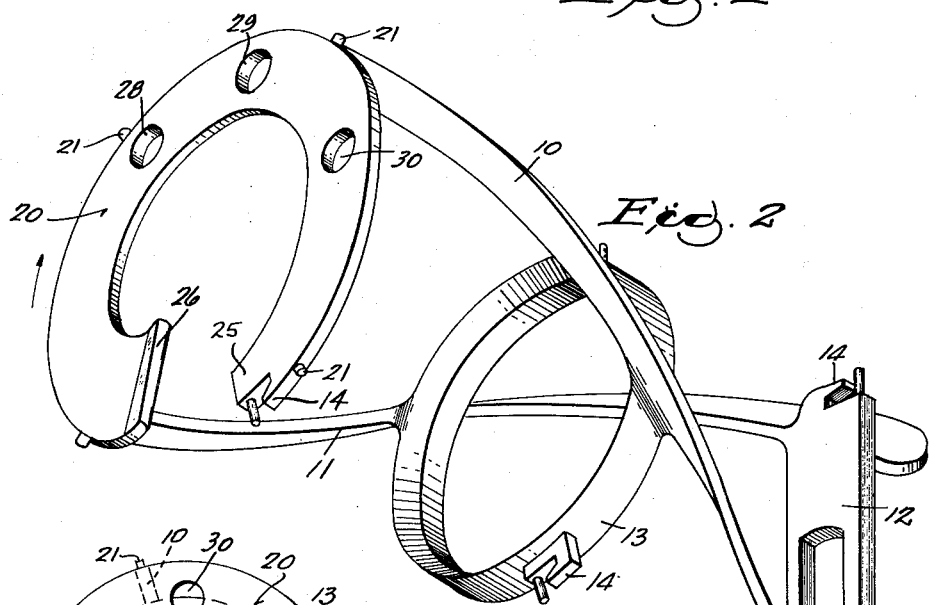
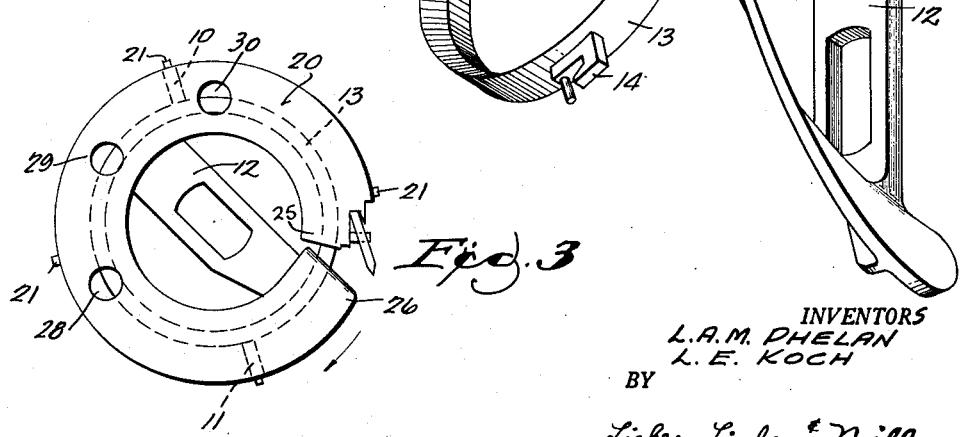

This invention relates generally to continuous freezers for soft ice cream, custards, and the like, in which the mix is fed into one end of a refrigerated freezing cylinder, thoroughly mixed and aerated and simultaneously fed to the other or discharge end of the cylinder. A serving valve is located at the discharge end of the cylinder and when this valve is open, the finished product is forcibly ejected through the valve. The present invention relates, more particularly, to what is commonly referred to in the trade as a beater or dasher that is rotatably driven within the cylinder. It is this beater that performs the above-mentioned functions of mixing, aerating, and feeding the product.

The present invention is in the nature of an improvement over the beater shown in U. S. Patent No. 2,810,557, issued October 22, 1957, wherein the beater is centrally unsupported and instead finds its support for rotation against the inner wall of the cylinder. In this manner, the front cover and the beater can be easily removed and reassembled for frequent cleaning.

In the U. S. Patent No. 2,964,219, issued December 13, 1960, there is disclosed a front cover having a large hub extending into the front end of the freezing cylinder and which defines therewith a definite flow path for the product about to be served. That is to say, the paddle ends of the beater shown in the above two patents act to positively move the product around said flow path and forcibly eject or pump the product out of the serving valve located at the lower, front end of the cylinder.

The above arrangement has performed satisfactorily, but the present invention has resulted in much greater efficiency of feed, that is, in increased draw rates. In fact, by the use of the present invention, the draw rate has been more than doubled over that of the devices mentioned above.

Problems have arisen, however, in prior art devices, when trying to increase the draw rate too much, in other words, when applying too much pressure on the product in forcing it toward the serving valve. For example, it is essential to provide and maintain the necessary aeration of the product to give it the required overrun characteristics. Stated otherwise, some products require an overrun characteristic as high as 100% air by volume in the product, and much attention and effort has heretofore gone into the design of these beaters to provide this overrun for the product. One of the problems in attempting to increase the draw rate has been the actual deaeration of the product about to be served. This deaeration was caused by excessive compression of the product, which in turn was occasioned by the use of certain prior art structures, such as a substantially solid auger plate fixed to the front end of a beater.

Accordingly, the present invention provides an improved beater for a continuous freezer, which is highly efficient in ejecting the finished product but which does not deaerate it to any substantial degree. Furthermore, this improved beater provides good product circulation and consequently more even product temperature and control thereof.

These and other objects and advantages of the present invention will appear hereinafter as this disclosure progresses, reference being had to the accompanying drawings, in which:

FIGURE 1 is a side elevational view, in section, of a freezer mechanism embodying the present invention;

FIGURE 2 is a perspective view of the beater shown in FIGURE 1, and

FIGURE 3 is a front end view of the beater shown in FIGURE 2.

Referring in greater detail to the drawings, a horizontally disposed freezing cylinder 1 has a removable and insulated front cover 2 secured thereto by the large nuts 3 and studs 4 carried by the cylinder and which extend through the cover. The cover includes a large, centrally disposed hub 5 which extends into the front end of the cylinder, and a retarder 6 is fixed to this hub and extends well into the cylinder. This retarder serves to aid the beater in aerating the product by preventing the product from simply rotating around the cylinder with the beater.

A serving valve assembly V is located at the lower front side of the cover and is in communication with the interior of the cylinder via the discharge opening 8 extending through the cover.

As previously mentioned, the cover, retarder, and valve may be readily removed as a unit for cleaning the equipment, simply by removing the nuts 3.

The cover in conjunction with its hub and the interior of the front end of the cylinder define an annular flow path for the product which is ready to be served. The discharge opening 8 is located in the lower side of this path.

A temperature sensing element 9 is located on the outside of the cylinder and immediately beneath the location where the product leaves the cylinder. This is the critical area for sensing the temperature of the product about to be served, and it is this sensing element which controls the refrigeration equipment as fully disclosed in the U. S. Patent No. 2,930,203, issued on March 29, 1960, to one of the present inventors. For purposes of this disclosure, it is believed necessary only to say that a certain amount of circulation of the product in this area is necessary with the product farther back in the cylinder, in order to give a more even and uniform product temperature in the cylinder and consequently better temperature control of the entire unit. It should be appreciated that it is often necessary to hold the temperature of the product being served to within one-half of one degree Fahrenheit of a predetermined value, in order for the product to have the necessary characteristics of texture and stiffness.

The beater provided by the present invention may be similar in some respect to the type shown in the above-mentioned Patent No. 2,810,557, in that it may utilize the pair of helical screws 10 and 11 which are secured together by the rear drive member 12 and the intermediate ring 13. Mounting brackets 14 serve to swingably hold the scraper blades 15 in the known manner.

In accordance with the present invention, a steeply pitched auger ring 20 is welded to and across the front ends of the screws 10 and 11. The outside diameter of this ring is slightly less than the internal diameter of the cylinder and has a plurality of bearing pins 21 secured around its periphery. These pins are adapted to bear against the inner wall of the cylinder and thereby rotationally support the front end of the beater. The ring itself could not bear against the inner wall because any out-of-roundness of the wall would cause binding of the beater in the cylinder and consequent mangling of the beater. Thus, the beater is journalled at its front end around its periphery and no central bearing is required. The beater can consequently be easily removed from and replaced in the cylinder whenever the cover is removed and independently thereof.

The internal diameter of the ring is such that a small annular clearance 22 is provided between the ring and the hub.

The width of the ring is such that it substantially fills the distance between the hub and cylinder wall so that it acts to hold the majority of the product captive and positively move it around the annular flow path, as will appear.

In the illustration shown, the internal diameter of the ring is about 2½ times the width of the ring.

The ring rotates in the direction indicated by the arrow and the end 25 of the ring is the leading end in respect to the direction of rotation. A mounting bracket 14 is located adjacent this leading end and together with the axially aligned bracket on ring 13 serves to provide a mounting for one of the scraper blades 15. The trailing end 26 of the ring lies against the inner wall of the cover and as it slides over it the product is forced to move ahead of the blade and along the flow path.

Thus, the ring acts to compress the product or move it in an axially direction against the front cover, thereby forcibly ejecting it out through the opening 13 when valve V is open.

Relief holes 28, 29, and 30 are provided in the feed ring primarily for three purposes:

(1) To prevent excessive compression of the product and consequent deaeration thereof. This is accomplished by permitting some of the product, which has been trapped in the annular flow path in advance of the auger ring, to escape rearwardly through the holes. It has been found desirable to keep a considerable portion of the trailing end of the ring free of these relief holes, so that this trailing portion does the majority of the work in axially forcing the product toward the cover. In other words, as the trailing end portion of the ring moves over the product with the annular flow path, that particular portion of the product is more effectively trapped and moved by the ring.

(2) A second purpose of the holes 28—30 is to relieve a portion of the load on the motor by reducing the compressive action of the ring.

(3) The third and an important function of the holes 28—30 is to permit better circulation of the product, particularly between that located in the area of the serving valve and temperature sensing element and that located farther back in the cylinder. This circulation of the product provides a more uniform temperature of the product throughout the cylinder, resulting in the ability of the unit to better control and maintain constant and uniform temperatures of the product about to be served.

By means of the present invention, a particularly efficient feeding arrangement has been provided that has resulted in considerably higher draw rates without appreciable deaeration of the product. Good circulation of the product is also insured with consequent uniform temperature thereof and accurate control of the product temperature.

Various modes of carrying out the invention are contemplated as being within the scope of the following claims particularly pointing out and distinctly claiming the subject matter which is regarded as the invention:

1. In combination with a freezing cylinder having a front cover including a large hub extending centrally into said cylinder to define therewith an annular flow path, a rotary dasher comprising, helical screw means extending generally longitudinally in said cylinder for feeding material toward said cover, and a steeply pitched auger-ring secured across the front end of said screw means, said dasher at its front end bearing against the inner wall of said cylinder for being rotationally supported thereby, said auger-ring being located in said flow path and having such an internal diameter that it encompasses said hub in close proximity thereto and having a width substantially equal to the distance between said hub and inner wall of said cylinder, whereby the material fed by said screw means is positively moved around said flow path by said auger-ring.

2. A device as defined in claim 1 further characterized in that said auger-ring has a trailing end in respect to its direction of rotation which is adapted to rotate against said cover.

3. A device as defined in claim 1 further characterized in that said ring has a series of holes therethrough which prevent excessive compression of the product in said path and facilitate product circulation in said cylinder.

4. An elongated rotary dasher for use in the freezing cylinder of a dispensing ice cream freezer, said dasher comprising, a front end adapted to be rotationally supported by the inner wall of said cylinder, helical screw means adapted to move the product generally axially in said cylinder, and an auger-ring secured across the front end of said screw means and positioned transversely in respect to said elongated dasher, said auger-ring having a large central opening of such diameter that it constitutes the major portion of the outside diameter of said auger-ring.

5. A dasher as defined in claim 4 further characterized in that said auger-ring has a series of holes extending therethrough.

6. The device as defined in claim 5 further characterized in that said holes are located more toward the leading end of said auger-ring than toward its trailing end in respect to the direction of auger-ring rotation.

7. An elongated rotary dasher for use in a freezing cylinder and comprising, helical screw means adapted to move the product generally axially in said cylinder, an auger-ring secured across the front end of said screw means and positioned transversely in respect to said elongated dasher, said auger-ring having a large central opening of such diameter that it constitutes the major portion of the outside diameter of said auger-ring, and bearing means on the periphery of said auger-plate for rotationally supporting the front end of the dasher on the inner wall of said cylinder.

8. An elongated rotary dasher for use in the freezing cylinder of a dispensing ice cream freezer, said dasher comprising, a front end adapted to be rotationally supported by the inner wall of said cylinder, a pair of helical screws adapted to move the product generally axially in said cylinder, a drive member secured to and between the rear ends of said screws, an intermediate ring secured between said screws and intermediate the length thereof, and an auger-ring secured across the front end of said screws and positioned transversely in respect to said elongated dasher, said auger-ring having a large central opening of such diameter that it constitutes the major portion of the outside diameter of said auger-ring.

9. An elongated rotary dasher for use in a freezing cylinder and comprising, a pair of helical screws adapted to move the product generally axially in said cylinder, a drive member secured to and between the rear ends of said screws, an intermediate ring secured between said screws and intermediate the length thereof, an auger-ring secured across the front end of said screws and positioned transversely in respect to said elongated dasher, said auger-ring having a large central opening of such diameter that it constitutes the major portion of the outside diameter of said auger-ring, and bearing means on the periphery of said auger-plate for rotationally supporting the front end of the dasher on the inner wall of said cylinder.

References Cited in the file of this patent

UNITED STATES PATENTS

| | | |
|---|---|---|
| 903,104 | McCoy | Nov. 3, 1908 |
| 2,305,288 | Cavalleri | Dec. 15, 1942 |
| 2,474,730 | Espinasse et al. | June 28, 1949 |
| 2,810,557 | Phelan | Oct. 22, 1957 |